United States Patent [19]
Gosling et al.

[11] 3,912,284
[45] Oct. 14, 1975

[54] SEALING ASSEMBLIES

[75] Inventors: Alexander Bennett Gosling; Colin Howard Stanwell Smith; Paul Castle, all of London, England

[73] Assignee: Decca Limited, London, England

[22] Filed: Nov. 23, 1973

[21] Appl. No.: 418,263

[30] Foreign Application Priority Data
Jan. 23, 1973 United Kingdom................. 3486/73

[52] U.S. Cl. ........................ 277/18; 277/53; 277/59
[51] Int. Cl.² .......................................... F16J 15/40
[58] Field of Search ......... 277/133, 134, 15, 17, 18, 277/53–65

[56] References Cited
UNITED STATES PATENTS
3,355,179  11/1967  McGrew ............................ 277/134
3,622,164  11/1971  Hebert ............................... 277/134

*Primary Examiner*—Robert I. Smith
*Attorney, Agent, or Firm*—Edward F. Connors

[57] ABSTRACT

A sealing assembly for use between two regions containing working fluids at different pressures, comprising a rotary shaft, a sealing element encirling the shaft, a first seal including a first helical passageway which is defined between the sealing element and the shaft, a second seal encircling the shaft and spaced apart along the axis of the shaft from the first seal, a source of sealing fluid, and means for applying sealing fluid from the source to the shaft between the first and second seals.

3 Claims, 1 Drawing Figure

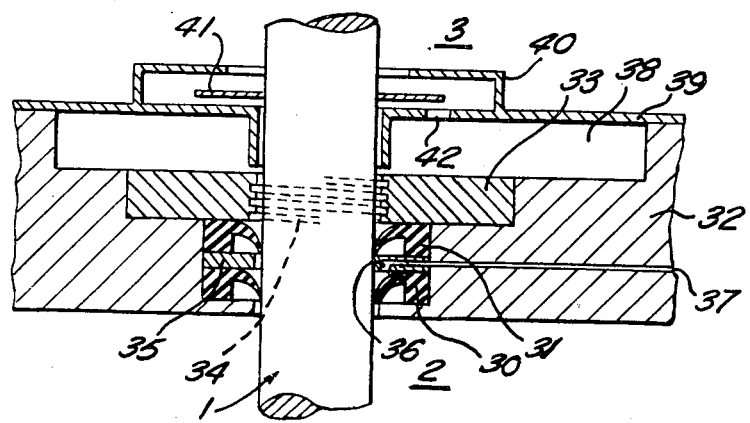

SEALING ASSEMBLIES

This invention relates to a sealing assembly for a rotatable shaft, and in particular to a sealing assembly for use between two regions containing working fluids at different pressures.

According to the present invention, there is provided a sealing assembly for use between two regions containing working fluids at different pressures, comprising a rotary shaft, a sealing element encircling the shaft, a first seal including a first helical passageway between the sealing element and the shaft, a second seal encircling the shaft and spaced apart from the first seal, and means for applying sealing fluid to the shaft between the first and second seals.

Reference will hereinafter be made to the accompanying drawings of which:

The drawing is a cross-sectional view of the preferred embodiment of the invention.

By way of example, a sealing assembly for a rotor housing having air at atmospheric pressure or above and containing a motor driving a shaft which extends into a high vacuum will be described. In this example, the shaft is considered to rotate in only one direction.

The drawing illustrates one embodiment of the invention wherein a shaft 1 is driven by a motor (not shown) contained within an enclosed region 2 having air at a pressure $P_1$ and is arranged to rotate in a second region 3 which is in a high vacuum.

In such embodiment, two lip seals 30 and 31 are located within a housing 32, below a sealing ring or collar 33 which surrounds the shaft 1. A helical groove 34 is provided on the inside surface of the sealing ring 33 for inducing a flow of sealing fluid towards the lip seals 30 and 31 when the shaft 1 is rotating. The lip seals 30 and 31 are separated by a spacer ring 35, which is provided with a radial passage 36 in communication with a passageway 37 in the housing 32. The passageway 37 is connected to a source of sealing fluid (not shown) which may be a reservoir. This arrangement allows sealing fluid to be introduced between the helical groove 34 and the lower lip seal 30, below the upper lip seal 31.

Under normal circumstances, the sealing fluid in the source is kept at a pressure which is substantially equal to $P_1$, the pressure in space 2. Thus, under normal conditions, whether the shaft is rotating or not, the lower lip seal 30 is not subjected to a differential pressure applied across it, and therefore acts to prevent sealing fluid entering the space 2. If in an emergency condition the upper seal 31 fails for any reason, when the shaft is stationary, thus lowering the pressure above lip seal 30, the lip seal 30 acts as a directional seal to prevent the fluid i.e. air in space 2 leaking into space 3. The upper seal 31, normally impedes any flow of sealing fluid upwards through the helical groove 34 when the shaft is stationary. However, since perfect sealing is not always possible, any leakage of sealing fluid that does occur due to the pressure differences across lip seal 31 and groove 34, tends to collect in a space 38 above the sealing ring 33. This accumulation of sealing fluid is pumped downward again by the helical groove 34 towards the lip seals 30 and 31 once the shaft is again rotated. The sealing fluid may return to the source either by passing downward past the lip seal 31, or by a separate passageway (not shown) which may be provided in the housing for this purpose. Generally, some sealing fluid remains in the helical groove 34 due to the pressure difference across it since the downward flow of fluid halts when the induced pressure from the pumping action equals the static pressure difference across the helical groove.

A cover 39 is located above the upper space 38 to hold sealing fluid within the space 38 so that the assembly can be inverted, if necessary, for a short period of time without harm. The cover 39 is provided with an additional part 40 to trap any sealing fluid which may creep up the shaft under surface tension forces. A "thrower" 41 may also be included to throw the sealing fluid into the part 40 when the shaft rotates, from whence it can return to the space 38 via a vent 42 in the cover 39.

We claim:

1. A sealing assembly for use with a shaft rotating between a region of high vacuum and a region containing a fluid at a working pressure, comprising a rotary shaft, a sealing element encircling the shaft, a first seal including a helical passageway which is defined between the sealing element and the shaft, a second seal comprising a lip seal encircling the shaft and spaced along the axis of said shaft from the first seal on the side thereof remote from the side of the assembly which is arranged to be adjacent the region of high vacuum, a third seal comprising another lip seal encircling the shaft between said first and second seals, a source of sealing fluid, means for applying sealing fluid to the shaft between the second and third seals, a housing which holds the sealing element and said seals, said shaft protruding through a bore in said housing, and a chamber for collecting any leakage of sealing fluid when said shaft is stationary, located in said housing adjacent the sealing element on the side of the assembly that is arranged to be adjacent the region of high vacuum.

2. A sealing assembly as in claim 1, wherein said sealing element has a helical groove constituting said helical passageway in the surface thereof which encircles the shaft.

3. A sealing assembly as in claim 1, wherein the means for applying sealing fluid to the shaft is connected to further passageways formed in the housing which lead to said bore.

* * * * *